(No Model.)
W. A. CROWDUS.
GALVANIC BATTERY.
No. 463,247. Patented Nov. 17, 1891.
FIG. 1.
FIG. 2.
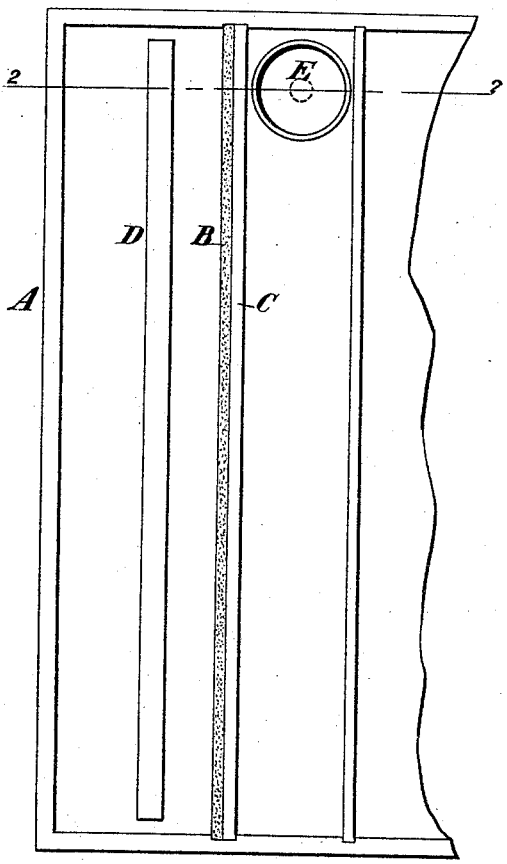
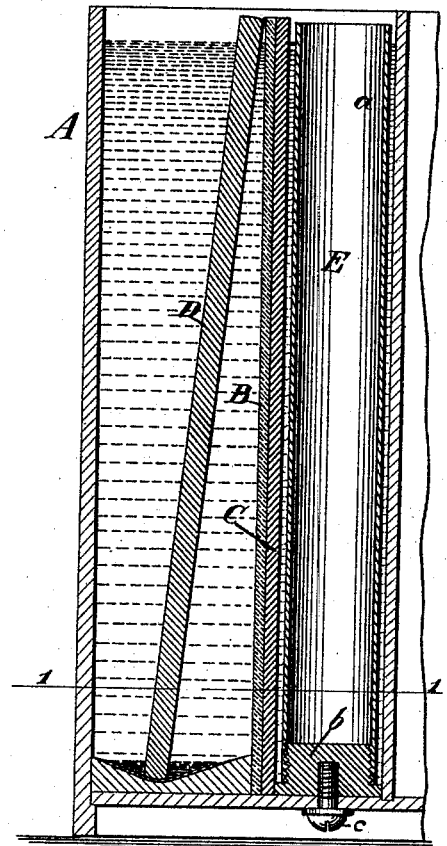
FIG. 3.  FIG. 4.
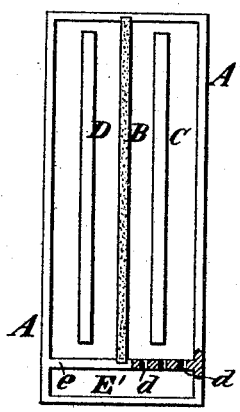
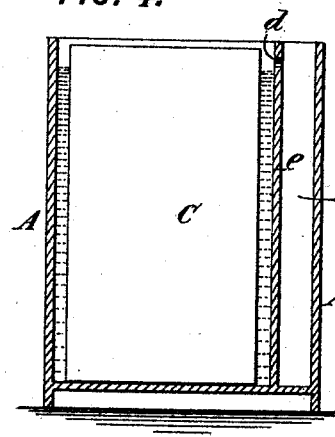
WITNESSES:
John Becker
Fred White
INVENTOR:
Walter Ambrus Crowdus,
By his Attorneys,
Arthur E. Fraser & Co.
THE NORRIS PETERS CO., PHOTO-LITHO., WASHINGTON, D. C.

UNITED STATES PATENT OFFICE.

WALTER AMBUS CROWDUS, OF MEMPHIS, TENNESSEE, ASSIGNOR TO JO. W. ALLISON, TRUSTEE, OF SAME PLACE.

GALVANIC BATTERY.

SPECIFICATION forming part of Letters Patent No. 463,247, dated November 17, 1891.

Application filed November 21, 1890. Serial No. 372,163. (No model.)

*To all whom it may concern:*

Be it known that I, WALTER AMBUS CROWDUS, a citizen of the United States, residing in Memphis, in the county of Shelby and State of Tennessee, have invented certain new and useful Improvements in Electric Batteries, of which the following is a specification.

This invention relates to chemical or galvanic batteries, being more especially designed for two-fluid batteries. It is well known that in certain batteries the volume of electrolytic fluid is increased by the electric action, so that if the cell be filled nearly full it is liable to overflow. My invention is designed to prevent this result.

Figure 1 of the accompanying drawings is a plan of one cell of a battery embodying my invention. Fig. 2 is a vertical cross-section thereof. Figs. 3 and 4 show a modified construction, the former being a plan and the latter a vertical section.

My invention consists in providing an overflow-receptacle within the battery cell or jar, with its top at a lower level than the top of the jar and higher than the normal or original level designed for the liquid. This receptacle is originally empty, and as the liquid increases in volume and its level rises it overflows the top of the receptacle, which thus receives the excess of liquid. The receptacle has sufficient capacity to receive the entire overflow of the liquid, so that after it is filled thereby the level of the liquid cannot rise materially above its top and consequently cannot overflow the cell.

Referring to Figs. 1 and 2, A is the battery cell or jar, B the porous partition, C the negative or carbon electrode, which is shown as a plate placed close against the porous partition, and D the positive electrode, which may be a zinc plate. The overflow-receptacle E is arranged to receive the overflow of the negative electrolyte, being placed in the negative cell or compartment containing the carbon plate. This overflow-receptacle is here constructed as a separate receptacle in the form of an open-topped cup, which is set in the battery-cell. Its height is such that its top comes slightly below the top of the jar. It is constructed preferably of a tube $a$, with its lower end screwed onto a plug $b$, which is fastened to the bottom of the jar by a screw $c$ or other fastening. When the cell is first filled this receptacle E is empty, the level of liquid being slightly below its top. As the liquid expands it overflows the top of the receptacle and more or less fills it, thus preventing its overflowing the cell.

The overflow-receptacle may be made as a compartment forming part of the jar, as shown in Figs. 3 and 4, where E' designates the overflow-compartment. The jar is constructed with this compartment at one side or end, and with perforations $d\,d$ through the intervening partition $e$, slightly below the top of the jar, and communicating with the compartment containing the negative electrolyte. The cell is filled with liquid to a level slightly below these holes, and as the level rises the liquid overflows through these holes into the compartment E'.

The overflow-receptacle may be otherwise constructed and arranged, its particular construction being immaterial to my invention.

I claim as my invention—

1. In a galvanic battery, the jar thereof provided with an overflow-receptacle arranged to receive and hold the excess of electrolytic liquid as it increases in volume and prevent its overflowing the cell, substantially as specified.

2. In combination with a galvanic battery, an overflow-receptacle within the battery-jar and in connection with the compartment containing the negative electrolyte adapted to receive the excess of liquid when its level rises and before it rises to the level of the jar, substantially as specified.

3. In combination with a galvanic battery, a removable receptacle in the battery-jar with its top at a level lower than the top of the jar, whereby it is adapted to receive the overflow of electrolytic liquid and prevent the overflowing of the cell, substantially as specified.

In witness whereof I have hereunto signed my name in the presence of two subscribing witnesses.

WALTER AMBUS CROWDUS.

Witnesses:
J. L. HUDGINS,
J. MYERS.